United States Patent
Amsterdam et al.

(10) Patent No.: US 10,133,335 B2
(45) Date of Patent: Nov. 20, 2018

(54) ADJUSTING INACTIVITY TIMEOUT SETTINGS FOR A COMPUTING DEVICE

(71) Applicant: International Business Machines Corporation, Armonk, NY (US)

(72) Inventors: Jeffrey D. Amsterdam, Roswell, GA (US); Rick A. Hamilton, II, Charlottesville, VA (US); Mauro Marzorati, Lutz, FL (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/721,276

(22) Filed: May 26, 2015

(65) Prior Publication Data
US 2015/0253838 A1    Sep. 10, 2015

Related U.S. Application Data

(63) Continuation of application No. 12/954,965, filed on Nov. 29, 2010, now Pat. No. 9,069,550.

(51) Int. Cl.
*G06F 17/24* (2006.01)
*G06F 1/32* (2006.01)
*G06F 17/27* (2006.01)

(52) U.S. Cl.
CPC .......... *G06F 1/3228* (2013.01); *G06F 1/3265* (2013.01); *G06F 17/24* (2013.01); *G06F 17/2775* (2013.01); *G06F 1/3231* (2013.01); *Y02D 10/153* (2018.01)

(58) Field of Classification Search
CPC ...... G06F 17/24; G06F 17/211; G06F 17/212; G06F 17/21; G06F 1/3228; G06F 1/3265; G06F 1/3231; Y02D 10/153
See application file for complete search history.

(56) References Cited

U.S. PATENT DOCUMENTS

| | | | |
|---|---|---|---|
| 6,016,467 A * | 1/2000 | Newsted | G06F 8/33 704/9 |
| 6,246,397 B1 | 6/2001 | Vossler | |
| 6,374,145 B1 | 4/2002 | Lignoul | |
| 6,493,707 B1 * | 12/2002 | Dey | G06F 17/30017 |
| 6,516,421 B1 | 2/2003 | Peters | |

(Continued)

OTHER PUBLICATIONS

USPTO Office Action, U.S. Appl. No. 12/954,965, dated Mar. 1, 2013, 20 pages.

(Continued)

*Primary Examiner* — Thu Huynh
(74) *Attorney, Agent, or Firm* — William H. Hartwell; Maxine L. Barasch; Keohane & D'Alessandro PLLC

(57) ABSTRACT

In general, embodiments of the invention provide an approach to proactively adjust timeout settings on a display device based on user activity. Specifically, a system and method are presented to adaptively adjust the inactivity timeout settings on a display device based on the application being used, the content being displayed on the device, and an analysis of the user's history with the application. The present invention calculates an inactivity timeout modifier which is utilized to modify the default operating system timeout value.

18 Claims, 8 Drawing Sheets

(56) References Cited

U.S. PATENT DOCUMENTS

| | | |
|---|---|---|
| 6,563,495 B1 | 5/2003 | Griepentrog |
| 6,577,330 B1* | 6/2003 | Tsuda ............... G06F 3/04815 |
| | | 715/781 |
| 6,903,743 B2 | 6/2005 | Ng |
| 8,095,575 B1* | 1/2012 | Sharma ............... G06F 17/211 |
| | | 707/811 |
| 8,271,865 B1 | 9/2012 | Bennett |
| 8,301,586 B1 | 10/2012 | Lattyak et al. |
| 8,645,328 B2* | 2/2014 | Sims ............... G06F 11/008 |
| | | 707/662 |
| 2001/0007980 A1 | 7/2001 | Ishibashi et al. |
| 2002/0059335 A1* | 5/2002 | Jelbert ............... G06F 17/30707 |
| | | 715/205 |
| 2002/0065848 A1 | 5/2002 | Walker et al. |
| 2003/0110129 A1 | 6/2003 | Frazier et al. |
| 2004/0153963 A1 | 8/2004 | Simpson et al. |
| 2005/0060669 A1 | 3/2005 | Lowles |
| 2006/0015827 A1 | 1/2006 | Ferguson et al. |
| 2006/0033718 A1 | 2/2006 | Griffin |
| 2006/0036963 A1 | 2/2006 | Taylor |
| 2006/0277177 A1* | 12/2006 | Lunt ............... G06F 17/3012 |
| 2006/0284838 A1 | 12/2006 | Tsatalos et al. |
| 2007/0067294 A1 | 3/2007 | Ward et al. |
| 2007/0159449 A1 | 7/2007 | Yoo et al. |
| 2008/0077517 A1 | 3/2008 | Sappington |
| 2008/0097731 A1* | 4/2008 | Lanes ............... G06Q 10/087 |
| | | 703/2 |
| 2008/0133287 A1 | 6/2008 | Slattery |
| 2008/0218535 A1 | 9/2008 | Forstall et al. |
| 2009/0150833 A1 | 6/2009 | Duncan, Jr. et al. |
| 2009/0158221 A1 | 6/2009 | Nielsen et al. |
| 2009/0172607 A1 | 7/2009 | Dai et al. |
| 2009/0296124 A1* | 12/2009 | Ohguro ............... G06F 17/241 |
| | | 358/1.9 |
| 2012/0054672 A1 | 3/2012 | McDowell |

OTHER PUBLICATIONS

USPTO Final Office Action, U.S. Appl. No. 12/954,965, dated Jun. 10, 2013, 22 pages.

USPTO Notice of Allowance and Fee(s) Due, U.S. Appl. No. 12/954,965, dated Feb. 27, 2015, 8 pages.

* cited by examiner

ADJUSTING INACTIVITY TIMEOUT SETTINGS FOR A COMPUTING DEVICE

CROSS-REFERENCE TO RELATED APPLICATIONS

The present patent document is a continuation of U.S. patent application Ser. No. 12/954,965, filed Nov. 29, 2010, entitled "ADJUSTING INACTIVITY TIMEOUT SETTINGS FOR A COMPUTING DEVICE", the disclosure of which is incorporated herein by reference.

TECHNICAL FIELD

The present invention relates to adjusting inactivity timeout settings for a computing device (e.g., display device). Specifically, the present invention provides a system and method to adaptively adjust the inactivity timeout settings on a display device based on the application being used, the content being displayed on the device, and an analysis of the user's history with the application.

BACKGROUND

Many processor-based devices have various inactivity timeout rules which trigger certain events based on the length of time since the user last appeared active. An inactivity timeout is a predefined amount of time that is assumed to accurately signal that the device is no longer in use. For example, most display devices have a dimming feature which will dim the display in order to save power. Typically, this dimming will take place on a system-wide basis and will be enacted based on user interaction and a time delay. A typical computer screen saver is one well-known example of this feature. However, many other devices, such as gaming consoles, mobile phones, or tablet devices also have analogous dimming features.

This simple time-based method does not account for interactions a user may be having with the display device without using an input device. For example, a user may be reading a document on the display or watching a video. These are two activities which are time-consuming but do not necessarily require user input. If the device is set to enter a power saving mode, the user may be interrupted if the user is taking a long time to read the screen or watch the video.

SUMMARY

In general, embodiments of the present invention provide an approach to adaptively adjusting the inactivity timeout settings on a display device. Specifically, a system and method are presented to adaptively adjust the inactivity timeout settings on a display device based on the application being used, the content being displayed on the device, and an analysis of the user's history with the application.

In one embodiment, there is a method for adjusting an inactivity timeout setting on a display device of a user. In this embodiment, the method comprises: detecting the application that has operating system focus on the display device; capturing the content displayed on the display device; retrieving the operating system timeout value; monitoring user activity while using the application; storing user activity as historical data; determining an inactivity timeout modifier based on one or more of the application, content, historical data, and system timeout value; storing the inactivity timeout modifier; and adjusting the inactivity timeout setting based on the inactivity timeout modifier.

In a second embodiment, there is a system for adjusting an inactivity timeout setting on a display device of a user. In this embodiment, the system comprises: at least one processing unit and memory operably associated with the at least one processing unit. An inactivity timeout adjustment tool is storable in memory and executable by the at least one processing unit. The inactivity timeout adjustment tool is configured to: detect the application that has operating system focus on the display device; capture the content displayed on the display device; retrieve the operating system timeout value; monitor user activity while using the application; store user activity as historical data; determine an inactivity timeout modifier based on one or more of the application, content, historical data, and system timeout value; store the inactivity timeout modifier; and adjust the inactivity timeout setting based on the inactivity timeout modifier.

In a third embodiment, there is a computer-readable medium storing computer instructions which, when executed, enables a computer system to adjust an inactivity timeout setting on a display device of a user, the computer readable medium comprising: program code for causing a computer system to: detect the application that has operating system focus on the display device; capture the content displayed on the display device; retrieve the operating system timeout value; monitor user activity while using the application; store user activity as historical data; determine an inactivity timeout modifier based on one or more of the application, content, historical data, and system timeout value; store the inactivity timeout modifier; and adjust the inactivity timeout setting based on the inactivity timeout modifier.

In a fourth embodiment, there exists a method for deploying a system for adjusting an inactivity timeout setting on a display device of a user. In this embodiment, a computer infrastructure is provided and is operable to: detect the application that has operating system focus on the display device; capture the content displayed on the display device; retrieve the operating system timeout value; monitor user activity while using the application; store user activity as historical data; determine an inactivity timeout modifier based on one or more of the application, content, historical data, and system timeout value; store the inactivity timeout modifier; and adjust the inactivity timeout setting based on the inactivity timeout modifier.

BRIEF DESCRIPTION OF THE DRAWINGS

These and other features of this invention will be more readily understood from the following detailed description of the various aspects of the invention taken in conjunction with the accompanying drawings in which.

Figure 1:
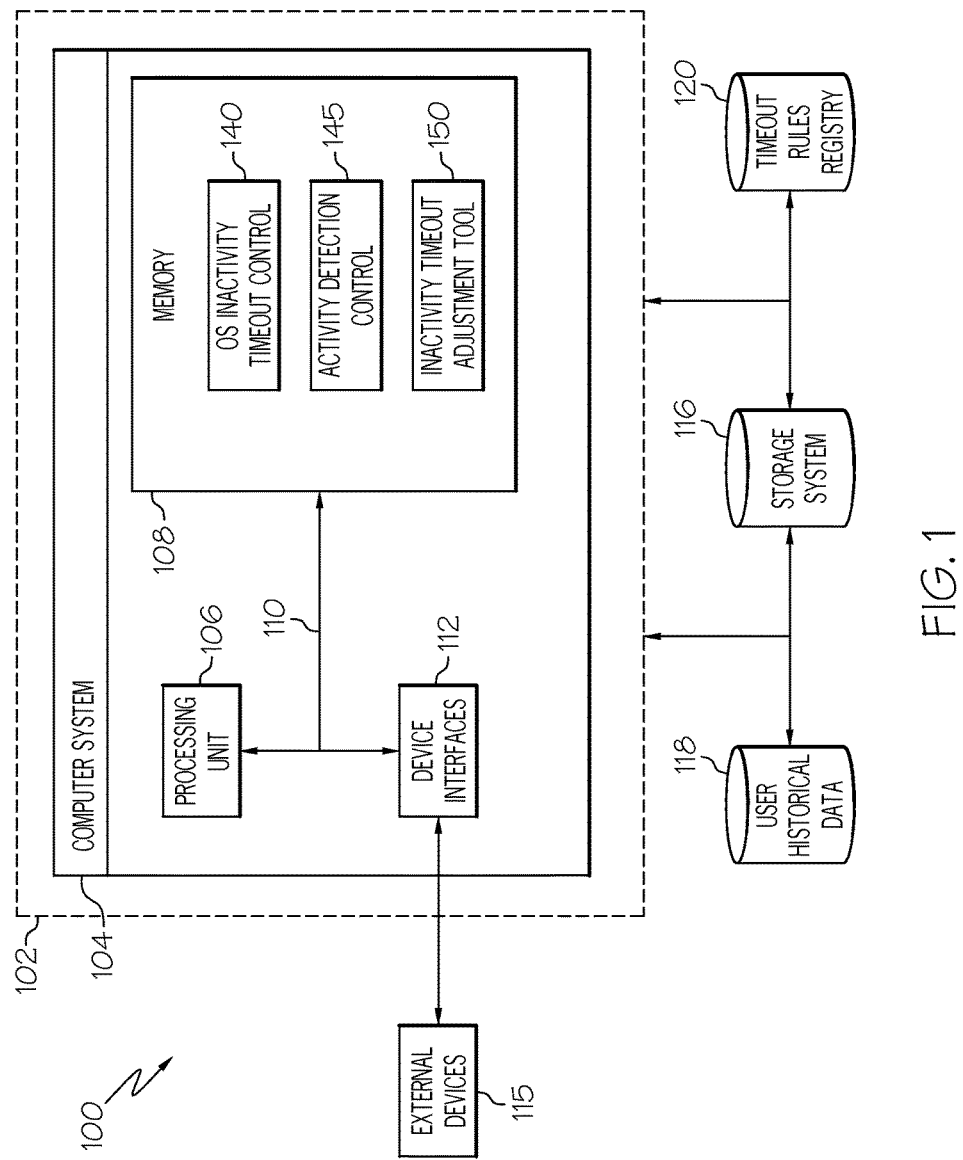
FIG. 1 illustrates a computerized implementation 100 of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the invention provide an approach to adjust the inactivity timeout settings on a computing device. Specifically, an approach is presented for adaptively adjusting the inactivity timeout settings on a display device based on the application being used, the content being displayed on the device, and an analysis of the user's history with the application. The methods for improved inactivity timeouts may be implemented through an operating system or an application running on the device.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for adaptively adjust the inactivity timeout settings on a display device according to the present invention. It should be understood that any other computers implemented under the present invention may have different components/software, but will perform similar functions. As shown, computer system 104 includes a processing unit 106, memory 108 for storing an inactivity timeout adjustment tool 150, a bus 110, and device interfaces 112.

Processing unit 106 collects and routes signals representing outputs from external devices 115 (e.g., a keyboard, a pointing device, a display, a graphical user interface, etc.) to inactivity timeout adjustment tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating inactivity timeout adjustment tool 150, which is stored in memory 108 and/or storage system 116. While executing computer program code, processing unit 106 can read and/or write data to/from memory 108, storage system 116, user historical data 118, and timeout rules registry 120. Storage system 116, user historical data 118, and timeout rules registry 120 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

An operating system (OS) inactivity timeout control is presently found on many operating systems that support inactivity timeouts. Operating systems have a default timeout value, but the user may modify this value. Likewise, most operating systems have a form of a user activity detection control which detects user activity, such as keystrokes or mouse movements. OS inactivity timeout control 140 and activity detection control 145 are shown in FIG. 1.

An OS setting indicates how often (in milliseconds) the system checks for user inactivity. After each user activity, the idle time is reset and begins again to accrue. If the idle time reaches the defined timeout value, an 'idle' signal is sent to the OS to perform an inactivity timeout event, such as dimming the display or launching a screen saver. For illustrative purposes, this disclosure will focus on dimming the display of a user device when the inactivity timeout rules are triggered.

In one embodiment of the present invention, native OS inactivity timeout control 140 is augmented to support the real-time altering of inactivity timeouts or determine whether an inactivity timeout event should proceed. Native activity detection control 145 is also augmented to provide information, either by notification or by being polled, related to user activity to inactivity timeout adjustment tool 150. The functions and responsibilities of the two controls will be described in more detail below.

Figure 2:
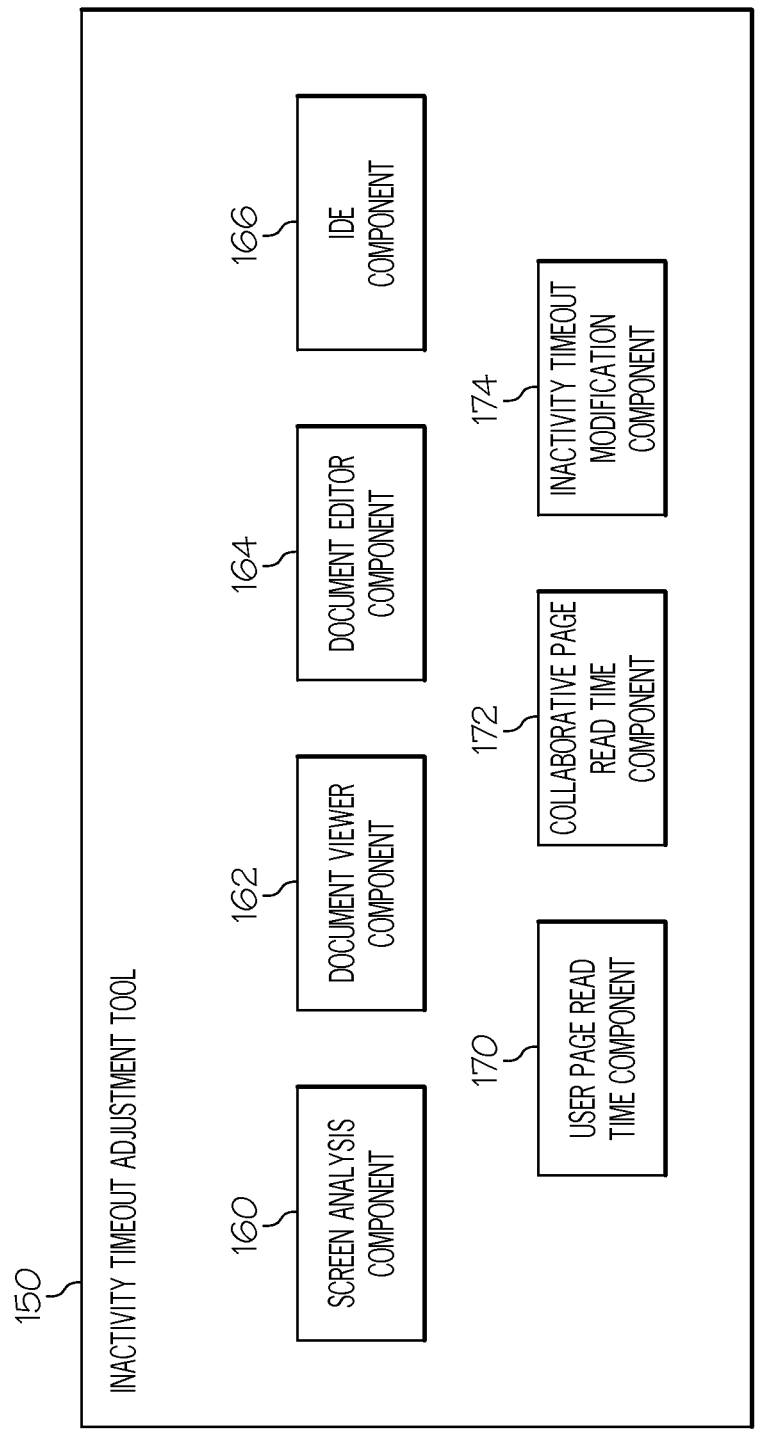
FIG. 2 depicts an inactivity timeout adjustment tool according to one embodiment of the present invention.

FIG. 2 shows a more detailed view of an exemplary inactivity timeout adjustment tool 150 shown in FIG. 1. Inactivity timeout adjustment tool 150 comprises screen analysis component 160, document viewer component 162, document editor component 164, IDE component 166, user page read time component 170, collaborative page read time component 172, and inactivity timeout modification component 174.

Figure 3:
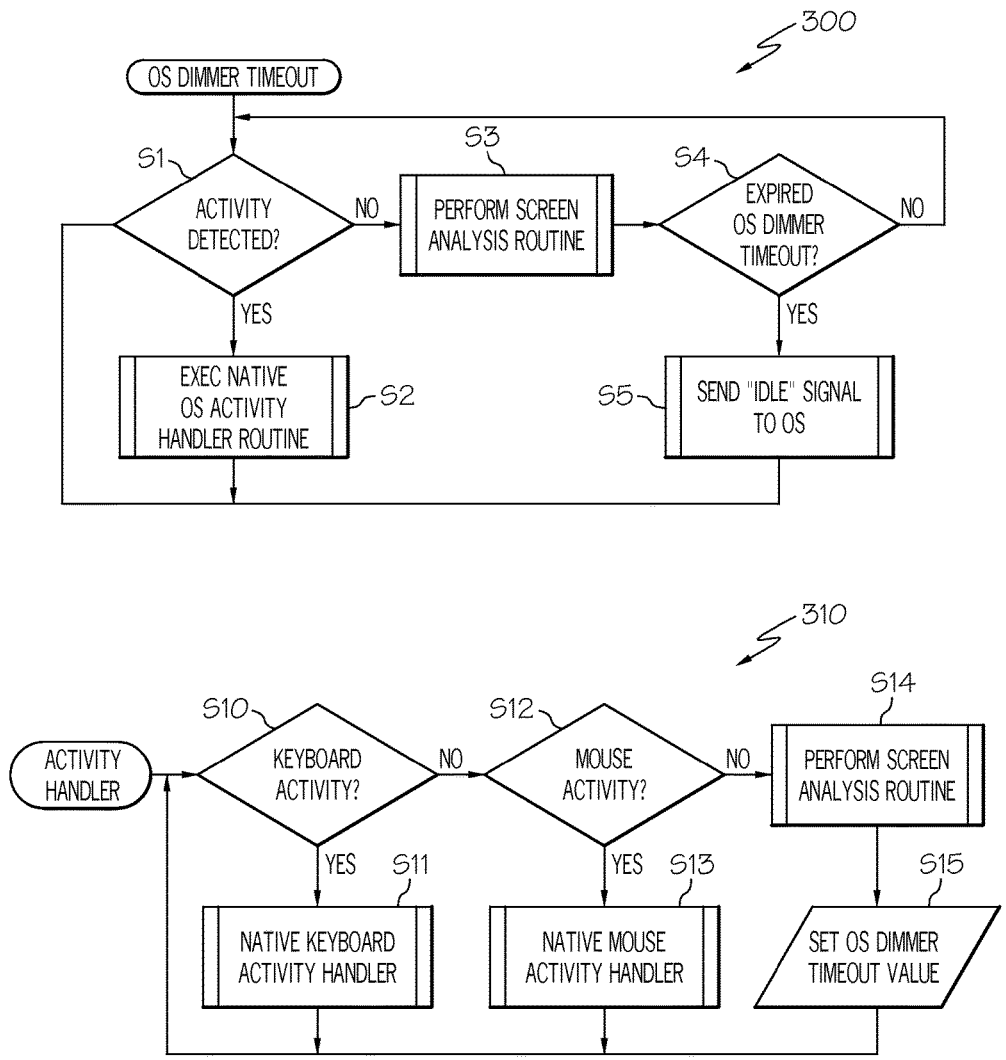
FIG. 3 shows flow diagrams for an operating system timeout routine and an activity handler routine.

Referring now to FIGS. 3-8, inactivity timeout adjustment tool 150 will be described in conjunction with a set of process flows. FIG. 3 depicts two native OS routines: OS dimmer timeout function 300 and activity handler function 310. OS inactivity timeout control 140 performs OS dimmer timeout function 300. Any adjustments made to the default OS timeout value are stored as inactivity timeout modifiers in timeout rules registry 120. Timeout modifiers may be an offset to the OS timeout value or a replacement value. Activity detection control 145 performs activity handler function 310. The two functions are described in detail below.

Referring now to OS dimmer timeout function 300, activity detection control 145 continually checks for user activity (S1). If activity is detected, native OS activity handler routine is executed (S2). If no activity is detected when checked, a screen analysis routine is executed (S3). Screen analysis routine is discussed in detail below. After the screen analysis routine has completed, the length of inactivity time is checked against the OS dimmer timeout rules (S4) stored in timeout rules registry 120. If the dimmer timeout threshold has not been reached, the system returns to monitoring for user activity. If the dimmer timeout threshold has been reached, an 'idle' signal is sent to the OS (S5) to perform the inactivity timeout event (i.e., dimming of the display).

When a user activity is detected, activity handler 145 is executed to determine what action to take. The first check is whether the user activity was a keystroke (S10). If a keystroke was made by the user, a native keyboard activity handler routine is executed (S11). If not a keystroke, the next check is whether the user activity involved the mouse (S12). If the mouse was used, a native mouse activity handler routine is executed (S13). If not mouse activity, a screen analysis routine is executed (S14). After the screen analysis routine has completed, an OS dimmer timeout value is set (S15).

Figure 4:
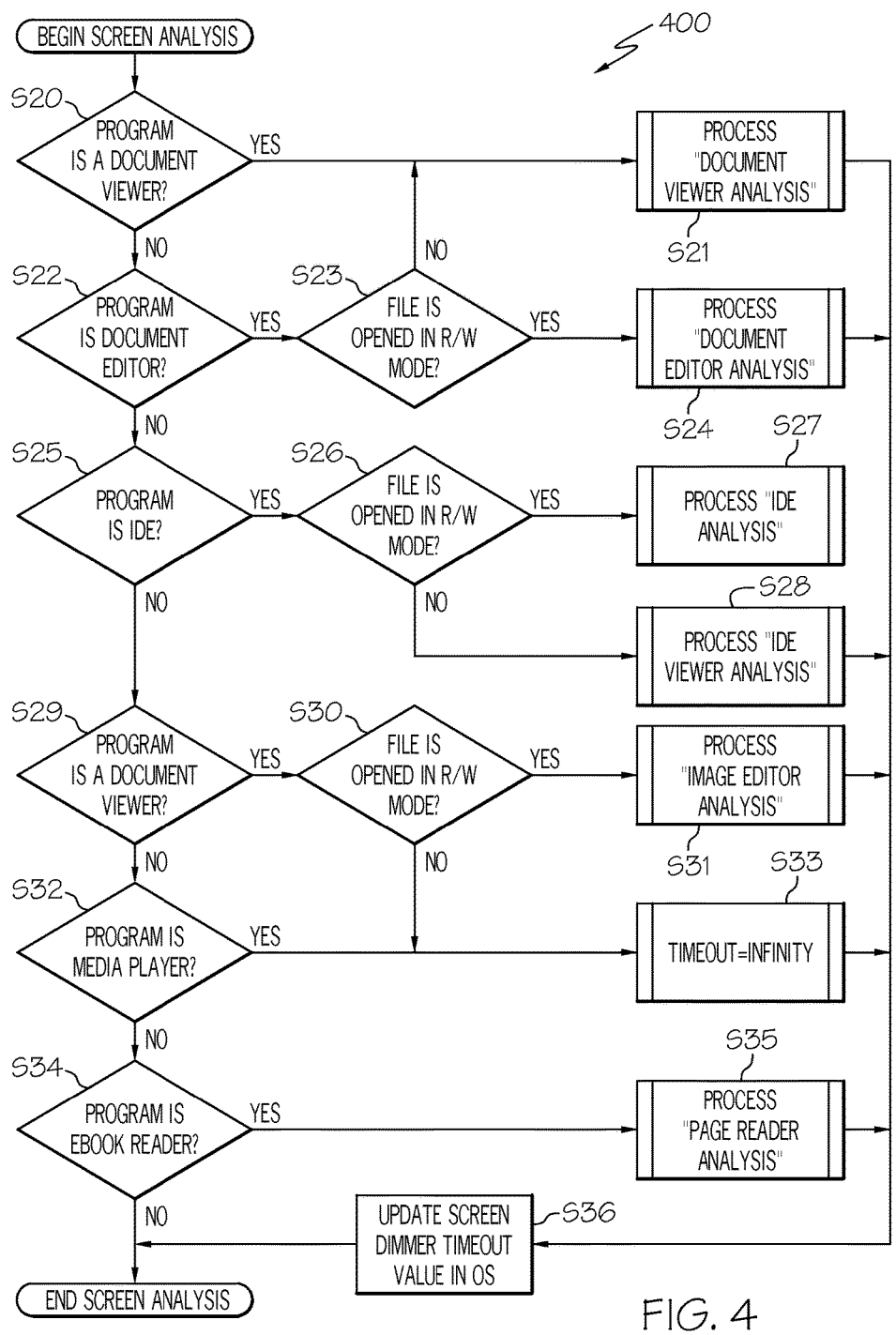
FIG. 4 shows a flow diagram for a usage screen analysis routine according to one embodiment of this invention.

Screen analysis component 160 performs screen analysis routine 400. This component analyzes user activity including what application is being used and what type of file is open to make adjustments to the timeout rules which are better aligned with actual user needs. FIG. 4 depicts the process flow of screen analysis routine 400. Discussed below in more detail are several types of text-based inactivity modules including document viewing, document editing, software program viewing, and software program editing. It should be noted that these types are illustrative only and are not intended to limit the scope of the present invention.

Screen analysis begins with determining what type of application is currently running on the device. If the user is viewing a document (S20), then a document viewer analysis routine is executed (S21). A document viewer analysis routine is performed by document viewer component 162.

Consider the user interactions required when reading an electronic document. In this scenario, the number of keystrokes is not a good predictor of when to enable power savings methods via an inactivity timeout. Instead, document viewer component 162 analyzes the text's readability as calculated by one of the several reading index formulas in common use. If the text is obtuse (e.g., a physics text, or classical/non-native language) and thus difficult to read, the inactivity timeout modifier stored in timeout rules registry 120 is modified to a higher value than if the text were simpler to read.

Figure 5:
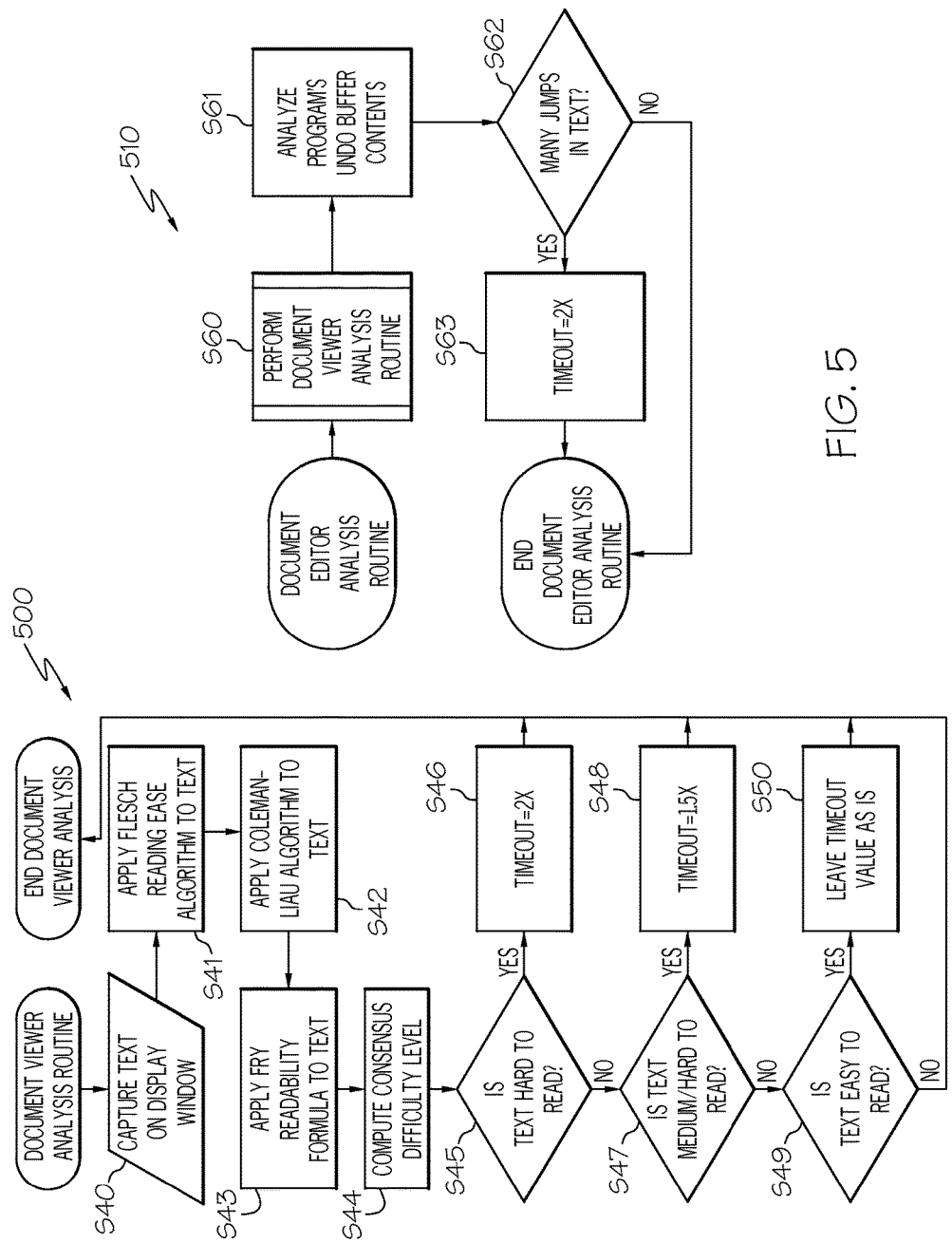
FIG. 5 shows flow diagrams for a document viewer analysis routine and a document editor analysis routine.

The process flow for document viewer analysis routine 500 is depicted in FIG. 5. The text is captured from the display screen (S40). Next, one or more readability algorithms are performed to determine the difficulty level of the text. In this example, three different tests are applied. First, the Flesch reading ease algorithm is performed on the text to determine its ease of reading (S41). The algorithm is designed to indicate the level of difficulty when reading the text and includes core measures of word length and sentence length to generate a score. Second, the Coleman-Liau algorithm is applied to the text. (S42) The Coleman-Liau index is a readability test used to gauge the understandability of the text. Third, the Fry readability test is applied to the text (S43). The reading difficulty level under the Fry test is calculated by the average number of sentences and syllables per hundred words. The values from the three tests are used to calculate an overall difficulty value of the text (S44).

In one embodiment, the calculated difficulty value of the text is compared against predefined threshold values stored in timeout rules registry 120. For example, separate threshold values representing text that is hard to read and text that is medium hard to read are defined. A difficulty value that is less than the lower threshold is determined to be easy to read. If the text is determined to be hard to read (S45), meaning the calculated difficulty level reaches the hard to read threshold, the timeout value is doubled (S46). If the text is determined to be medium hard to read (S47), the timeout value is multiplied by 1.5 (S48). If the text is easy to read (S49), the timeout value is not changed (S50).

If the application is not a document viewer, screen analysis component 160 checks whether the application is a document editor (S22). If so, screen analysis component 160 checks to determine whether the document is open in read/write mode, allowing the user to make modifications to the document (S23). If the document is open in read/write mode, control is handed over to document editor component 164. Document editor component 164 executes document editor analysis routine (S24). If the document is open in read-only mode, control is handed over to document viewer component 162, which executes document viewer analysis routine (as described above) to adjust the timeout value, if necessary, based on the readability of the text.

Document editor analysis function 510 is depicted in FIG. 5. Consider the activity of editing a document. Document editing is determined when applications such as a word processing program has operating system focus. In computing, the focus indicates the application on the display device which is currently selected by the user. In these types of activities, the number of keystrokes may be relevant, but a better predictor of activity is the complexity of the text that is being written. Like the module above, this can be calculated from one of the several reading index formulas in common use today. Furthermore, the number of transitions between keyboard and mouse/pointer activity, or 'jumps' in the position of the cursor, can be used to augment the idle timeout value.

Document editor analysis function 510 begins with performing document viewer analysis routine 500 to acquire a difficulty level of the text (S60). Next, the program's undo buffer is analyzed (S61). In the editing context, the program's undo buffer is referenced as a baseline for determining the complexity of the text being edited. As with each of the user activities, a contextual complexity analysis within computing activities is done to achieve the usage improvements (S62). The timeout modifier is adjusted based on the analysis (S63).

In reading activities, one can apply known readability calculations to determine complexity, whereas in editing activities these techniques are not applicable due to the inherent incompleteness of the text being analyzed. Doing an analysis of the program's undo buffer, which contains the text being added and removed, as well as its location, can yield the amount of jumping around that the editor is performing. This serves as an indication of the complexity of the input operation.

Consider that if the user is simply typing sequentially within the editor, no matter how complex the input, the typing activity is a good predictor of activity. A user that is jumping around to several different areas within the editor is likely constructing a more complex document. In other words, the user is likely reading, reprocessing the read material, and writing new text in different locations as the writing process advances. As such, the amount of variability in the text insertion points is a good predictor of complexity and therefore used as an indicator as to whether there are many jumps or few jumps in text insertion points. Using this information, the inactivity timeout modifier stored in timeout rules registry 120 is adjusted accordingly.

Referring back to FIG. 4, screen analysis component 160 next checks whether the user application is an IDE (S25), if the application has not yet been identified. An integrated development environment (IDE) is a software application that provides comprehensive facilities to computer programmers for software development. If the user application is an IDE, control is handed over to IDE component 166. IDE component 166 determines whether the file is open in read/write mode (S26). If the file is open in read/write mode, IDE component 166 executes IDE analysis routine (S27). If the file is open in edit mode, IDE component 166 executes IDE viewer analysis routine (S28).

Figure 6:
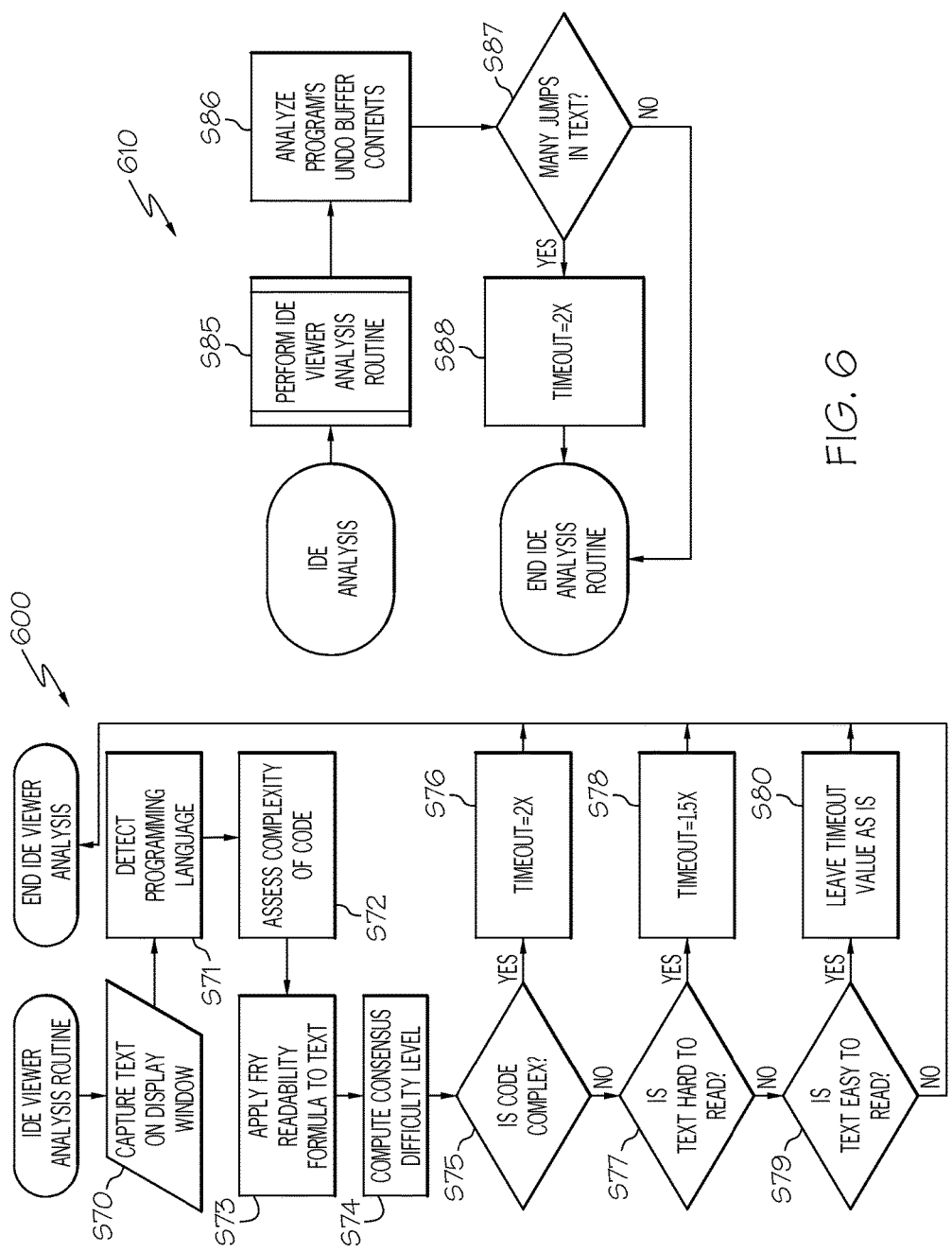
FIG. 6 shows flow diagrams for an IDE viewer analysis routine and an IDE analysis routine.

The process flow of IDE viewer analysis function 600 is depicted in FIG. 6. A user engaged with a program editing application, such as an IDE, should have his inactivity timeouts intelligently set in order to have a better user experience. Similar to the functions disclosed above, the number of transitions between writing in one location and reading from another location within the IDE, or possibly consulting reference material, are used to modify the inactivity timeout rules.

Referring back to IDE viewer analysis function 600, the program code is captured from the display screen (S70). The programming language is detected (S71). The complexity of the code is assessed (S72). The complexity of the programming activity is measured against the known measures of complexity in the code, such as number of external references or number of files open, within the context of the IDE. Measuring code complexity is a well-known domain in the computer sciences. Next, one or more readability algorithms are performed to determine the difficulty level of the text. As an example, the Fry readability test is applied to the text (S73). The results from the Fry readability test are used to calculate a difficulty value for the program code (S74).

The calculated difficulty value of the text is compared against predefined threshold values stored in timeout rules registry 120. For example, two threshold values representing text that is hard to read and text that is medium hard to read. A difficulty value that is less than the lower threshold means the text is determined to be easy to read. If the text is determined to be complex, meaning the calculated difficulty level reaches the hard to read threshold (S75), the timeout value is doubled (S76). If the text is determined to be of medium complexity (S77), the timeout value is multiplied by a value of 1.5 (S78). If the text is easy to read (S79), the timeout value is not changed (S80).

IDE analysis 610 is also illustrated in FIG. 6. First, IDE view analysis routine is performed (S85). The program's undue buffer is analyzed (S86). If there are many 'jumps' in the text (S87), then the timeout modifier is adjusted (S88).

Referring back to FIG. 4, the process continues its screen analysis in determining the current user application, if not already found. The next check is to determine whether the application is an image editor (S29). If the image is open in read/write mode (S30), then an image editor analysis routine is executed (S31). If the application is a media player (e.g., video or music) (S32), then a timeout event will not be triggered (S33). If the program is an eBook reader (S34), then a page reader analysis routine is executed (S35). After the proper routine has completed, the inactivity timeout modifier is updated (S36).

In another embodiment, the system empirically "learns" the user's reading speed and adjusts inactivity timeouts accordingly. User reading speed data is stored in user historical data 118. To determine reading speed, the user page read time component 170 detects when a page is fully loaded, and when the user requests the next page of text via either a keystroke or a mouse action. The component stores page reading data in user historical data 118.

For example, a user may have one page reading speed in a web browser and another in a book reader. In one embodiment, user average page reading times are stored in user historical data 118 for each application, along with additional details to more accurately estimate the user page reading speed based on the displayed content. For example, each website may have its own page reading speed. Likewise, each genre (fiction, physics textbook) in a book reader may have its own reading speed. Lastly, in the book reader example, each book may obtain its own page reading speed that is fine tuned as the user gets further into the book. For example, the page read time may first be set to the genre of the book, but once the user gets fifty pages into the book, the book may have its own discernible reading speed and the inactivity timeout modifier can be adjusted to be more accurate for the current book being read.

In another embodiment, collaborative page read time 172 component receives page reading speeds per document from a plurality of computing devices and stores the data in user historical data 118. Each document is uniquely identified using a variety of known techniques. Page reading speeds are used to calculate an average page reading speed for a document. From that information, when a new user opens the document for reading, the collaborative average reading speed is used as the default for the inactivity timeout modifier. In yet another embodiment, the devices track reading speed per page with each page having a collaborative value associated with it. In enhanced embodiments, the user's delta from the collaborative page read time is calculated, and that delta is applied to new documents to arrive at a better inactivity timeout modifier for the user.

The methods discussed above provide for adjusting the default timeout value residing in the OS by creating an inactivity timeout modifier. The process must also account for user interaction as the timeout event begins (i.e., the display on the device begins to dim). For example, as a user reads a book on a display device in which the adjusted timeout value is set to three minutes. The user finds the current text difficult to read and slows his reading pace to better comprehend the subject matter. The display begins to dim because three minutes have elapsed since the last page turn. The user wishes to continue reading and interacts with the device to un-dim the display. The inactivity timeout modifier is updated to allow for the slower pace for the book.

Inactivity timeout modification component 174 acts as a bridge between the various inactivity timeout components and the device's built-in inactivity timeout. The device queries the previously disclosed components to arrive at an accurate timeout and then sets, or resets, the device's inactivity timeout value by creating/updating the inactivity timeout modifier to the adjusted value.

One example in which the methods described above may be used is in a book reading application on a portable device. Since such portable devices have a limited battery power supply, it is desirable to have a short display dimmer timeout, meaning without user interaction, the device will dim in a relatively short period of time. However, if a user is a slow reader, this may not be the best behavior, since the user will have to interact with the device fairly often just to keep the screen brightened while reading. In this instance, the application may use the proposed methods to record how long it takes the user to read each page. The application also records if a user interacts with the application within a very short time period after dimming the display, indicating the user is still reading and did not wish for the device to be dimmed. This Information is used to create a modifier to the display dimmer timeout period. This information is specific to a user and the current reading material. Some books are read faster than others. By differentiating the data and calculating a reading time for each book style, the proposed methods find the most optimal display dimming settings to enable an enjoyable reading experience, balanced with the most efficient power saving methods.

Figure 7:
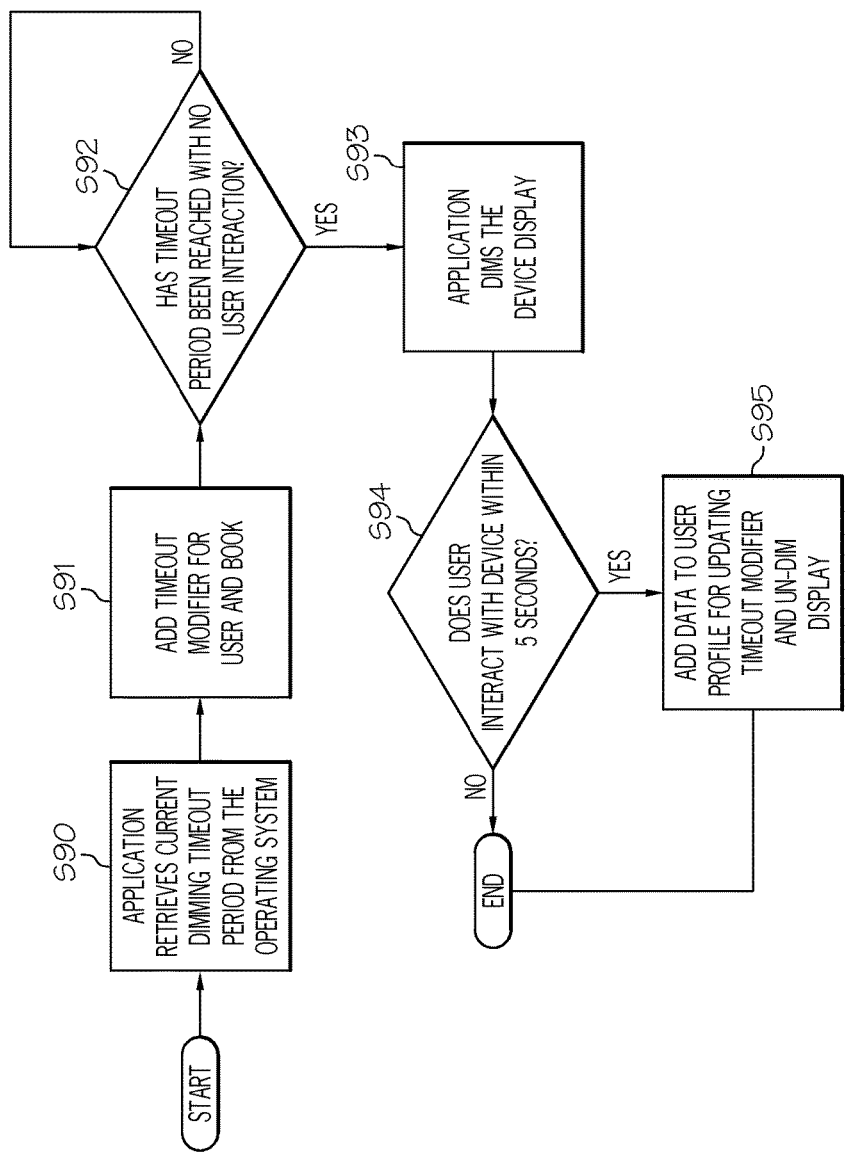
FIG. 7 shows a method flow diagram according to one embodiment of the present invention.
Figure 8:
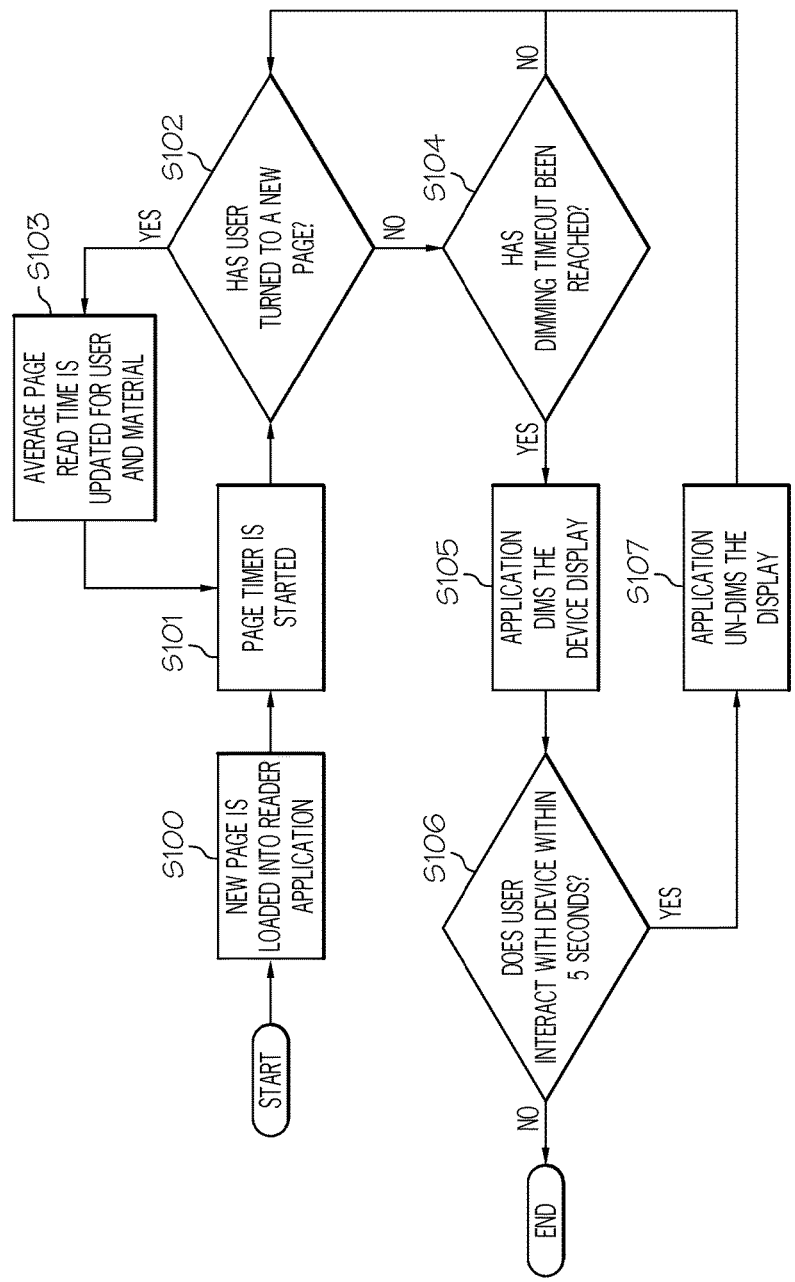
FIG. 8 shows a method flow diagram according to one embodiment of the present invention.

FIGS. 7-8 depict two book reading application examples in which elements of the present invention operate. In the examples, inactivity timeout adjustment tool 150 controls the display dimming. In FIG. 7, the application reads the current timeout period from the operating system (S90). Inactivity timeout adjustment tool 150 creates a timeout modifier using the methods detailed above for the user and book (S91). OS inactivity timeout control 140 continually checks to determine if the timeout period has been reached with no interaction (S92). If the timeout period is reached, the OS dims the display (S93). If the user interacts with the device within a predefined amount of time (e.g., 5 seconds) (S94), the timeout modifier associated with the user and book is updated by inactivity timeout adjustment tool 150, and the display is un-dimmed (S95).

In FIG. 8, inactivity timeout adjustment tool 150 is recording average time per page and adding that information as an input to adjust the timeout modifier. A new page is loaded into the reader application (S100). The page timer is started (S101). Inactivity timeout adjustment tool 150 continually checks to determine whether the user has turned the page (S102). If the user has turned the page, the page timer is reset and the average page read time is updated for the user and material (S103) by inactivity timeout adjustment tool 150. Average page read time for the user and material is stored in user historical data 118. Inactivity timeout adjustment tool 150 uses the data gathered in user historical data 118 to adjust the dimmer timeout modifier.

If the user has not turned the page, OS inactivity timeout control 140 checks the default OS timeout value and the inactivity timeout modifier to determine whether the timeout period has been reached (S104). If the timeout period is reached, the OS begins dimming the device (S105). If the user interacts with the device within a predefined amount of time (e.g., 5 seconds) (S106), the display is un-dimmed (S107) and inactivity timeout adjustment tool 150 returns to monitoring for a page turn.

Again, despite the illustrative focus on screen timeouts, it is important to reiterate that the principles described herein can be broadly applied to any timeout or inactivity-based change in system behaviors.

The process flow and method process flow diagrams discussed above illustrate the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the methodologies disclosed herein can be used within a computer system to adaptively adjust the inactivity timeout settings on a display device. In this case, inactivity timeout adjustment tool 150 can be provided, and one or more systems for performing the processes described in the invention can be obtained and deployed to computer infrastructure 102. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on, that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for adaptively adjusting the inactivity timeout settings on a display device. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for adjusting an inactivity timeout setting on a display device of a user, comprising:
   detecting an application of a document that has operating system focus on the display device;
   determining the application is not a document viewer and is a document editor;
   in response to the determining, checking the document is open in read/write mode or read-only mode;
   when the document is open in the read-only mode, executing a routine comprising:
      capturing content displayed on the display device, the content comprising text of the document;
      receiving an operating system timeout value;
      monitoring user activity while using, the application;
      storing the user activity as historical data;
      determining an inactivity timeout modifier by:
         analyzing an undo butler of the application, the undo butler comprising text of the document being added, text of the document being removed, a location of the text being added, and a location of the text being removed,
         calculating a readability score for the text of the document based on the analysis,
         comparing the readability score to at least one predefined threshold value, and
         selecting the inactivity timeout modifier based on the comparison;
      storing the inactivity timeout modifier; and
      adjusting the inactivity timeout setting based on the inactivity timeout modifier; and
   when the document is open in the read/write mode, executing a routine allowing the user to make modifications to the document.

2. The method of claim 1, wherein the application is either a document viewer or document editor displaying content including uneditable text.

3. The method of claim 1, further comprising:
   calculating a readability score for the text using at least one readability formula;
   retrieving at least one predefined threshold value; and
   including the readability score and at least one threshold value in determining the inactivity timeout modifier.

4. The method of claim 3, further comprising:
   calculating a reading speed for the user;
   storing the reading speed for the user; and
   including the reading speed in determining the inactivity timeout modifier.

5. The method of claim 3, further comprising:
   calculating an average reading speed for a plurality of device users;
   storing the average reading time for the plurality of device users; and
   including the average reading time in determining the inactivity timeout modifier.

6. The method of claim 1, wherein the application is either a document editor or software editor displaying content including editable text.

7. The method of claim 6, further comprising:
   calculating a readability score for the text using at least one readability formula;
   retrieving at least one predefined threshold value; and
   including the readability score and at least one threshold value in determining the inactivity timeout modifier.

8. The method of claim 1, wherein the inactivity timeout modifier is updated in response to occurrences after the inactivity timeout duration has occurred.

9. The method of claim 1, wherein a solution service provider provides a computer infrastructure operable to perform the method for one or more consumers.

10. A system for adjusting an inactivity timeout setting on a display device of a user, comprising:
    a bus;
    a processor coupled to the bus; and
    a memory medium coupled to the bus, the memory medium comprising instructions to:
       detect an application of a document that has operating system focus on the display device;
       determining the application is not a document viewer and is a document editor;
       in response to the determining, checking the document is open in read/write mode or read-only mode;
       when the document is open in the read-only mode, executing a routine comprising:
          capture content displayed on the display device, the content comprising text of the document;
          retrieve an operating system timeout value;
          monitor user activity while using the application;
          store the user activity as historical data;
          determine an inactivity timeout modifier by:
             analyze an undo buffer of the application, the undo buffer comprising text of the document being added, text of the document removed, a location of the text being added, and a location of the text being removed,
             calculate a readability score for the text of the document based on the analysis,
             compare the readability score to at least one predefined threshold value, and
             select the inactivity timeout modifier based on the comparison;
          store the inactivity timeout modifier; and
          adjust the inactivity timeout setting based mode inactivity timeout modifier; and when the document is open in the read/write mode, executing a routine allowing the user to make modifications to the document.

11. The system of claim 10, wherein the application is either a document viewer or document editor displaying content including uneditable text.

12. The system of claim 11, the memory medium further comprising instructions to:
calculate a readability score for the text using at least one readability formula;
retrieve at least one predefined threshold value; and
include the readability score and at least one threshold value in determining the inactivity timeout modifier.

13. The system of claim 11, the memory medium further comprising instructions to:
calculate a reading speed for the user;
store the reading speed for the user; and
include the reading speed in determining the inactivity timeout modifier.

14. The system of claim 11, the memory medium further comprising instructions to:
calculate an average reading speed for a plurality of device users;
store the average reading time for the plurality of device users; and
include the average reading time in determining the inactivity timeout modifier.

15. The system of claim 10, wherein the application is either a document editor or software editor displaying content including editable text.

16. The system of claim 15, the memory medium further comprising instructions to:
calculate a readability score for the text using at least one readability formula;
retrieve at least one predefined threshold value; and
include the readability score and at least one threshold value in determining the inactivity timeout modifier.

17. The system of claim 10, wherein the inactivity timeout modifier is updated in response to occurrences after the inactivity timeout duration has occurred.

18. A computer program product for adjusting an inactivity timeout setting on a display device of a user, the computer program product comprising a computer readable hardware storage device, and program instructions stored on the computer readable hardware storage device, to:
detect an application of a document that has operating system focus on the display device;
determining the application is not a document viewer and is a document editor;
in response to the determining, checking the document is open in read/write mode or read-only mode;
when the document is open in the read-only mode, executing a routine comprising:
capture content displayed on the display device, the content comprising text of the document;
retrieve an operating system timeout value;
monitor user activity while using the application;
store the user activity as historical data;
determine an inactivity timeout modifier by:
analyze an undo buffer of the application, the undo buffer comprising text of the document being added, text of the document being removed, a location of the text being added, and a location of the text being removed,
calculate a readability score for the text of the document based on the analysis,
compare the readability score to at least one predefined threshold value, and
select the inactivity timeout modifier based on the comparison; store the inactivity timeout modifier; and
adjust the inactivity timeout setting based on the inactivity timeout modifier; and
when the document is open in the read/write mode, executing a routine allowing the user to make modifications to the document.

* * * * *